(12) United States Patent
Dolgin et al.

(10) Patent No.: US 8,508,605 B2
(45) Date of Patent: Aug. 13, 2013

(54) METHOD AND APPARATUS FOR IMAGE STABILIZATION

(75) Inventors: Yuri Dolgin, Haifa (IL); Anatoly Gurevich, Beer-Sheva (IL); Eran Pinhasov, Zichron Yaakov (IL); Victor Pinto, Zichron-Yaakov (IL)

(73) Assignee: CSR Technology Inc., Sunnyvale, CA (US)

( * ) Notice: Subject to any disclaimer, the term of this patent is extended or adjusted under 35 U.S.C. 154(b) by 268 days.

(21) Appl. No.: 12/755,958

(22) Filed: Apr. 7, 2010

(65) Prior Publication Data

US 2011/0085049 A1  Apr. 14, 2011

Related U.S. Application Data

(60) Provisional application No. 61/251,379, filed on Oct. 14, 2009.

(51) Int. Cl.
*H04N 5/228* (2006.01)
(52) U.S. Cl.
USPC ............... 348/208.4; 348/208.1; 348/208.12
(58) Field of Classification Search
USPC .................. 348/208.99, 208.1, 208.4, 208.6, 348/208.12
See application file for complete search history.

(56) References Cited

U.S. PATENT DOCUMENTS

| | | | |
|---|---|---|---|
| 7,447,337 B2 * | 11/2008 | Zhang et al. | 382/107 |
| 2008/0212687 A1 | 9/2008 | Liu | |
| 2008/0291285 A1 | 11/2008 | Shimizu | |
| 2009/0232216 A1 | 9/2009 | Kurata | |
| 2009/0237516 A1 * | 9/2009 | Jayachandra et al. | 348/208.4 |

OTHER PUBLICATIONS

International Search Report and Written Opinion for International Patent Application No. PCT/US20101030286 mailed Jun. 9, 2010.
International Preliminary Report on Patentability for International Patent Application No. PCT/US2010/030286 mailed Nov. 7, 2011.

* cited by examiner

*Primary Examiner* — Daniel M Pasiewicz
(74) *Attorney, Agent, or Firm* — Frommer Lawrence & Haug LLP; John W. Branch

(57) ABSTRACT

A method and device are provided for method for stabilization of image data by an imaging device. In one embodiment, a method includes detecting image data for a first frame and a second frame, performing motion estimation to determine one or more motion vectors associated with global frame motion for image data of the first frame, performing an outlier rejection function to select at least one of the one or more motion vectors, and determining a global transformation for image data of the first frame based, at least in part, on motion vectors selected by the outlier rejection function. The method may further include determining a stabilization transformation for image data of the first frame by refining the global transformation to correct for unintentional motion and applying the stabilization transformation to image data of the first frame to stabilize the image data of the first frame.

56 Claims, 5 Drawing Sheets

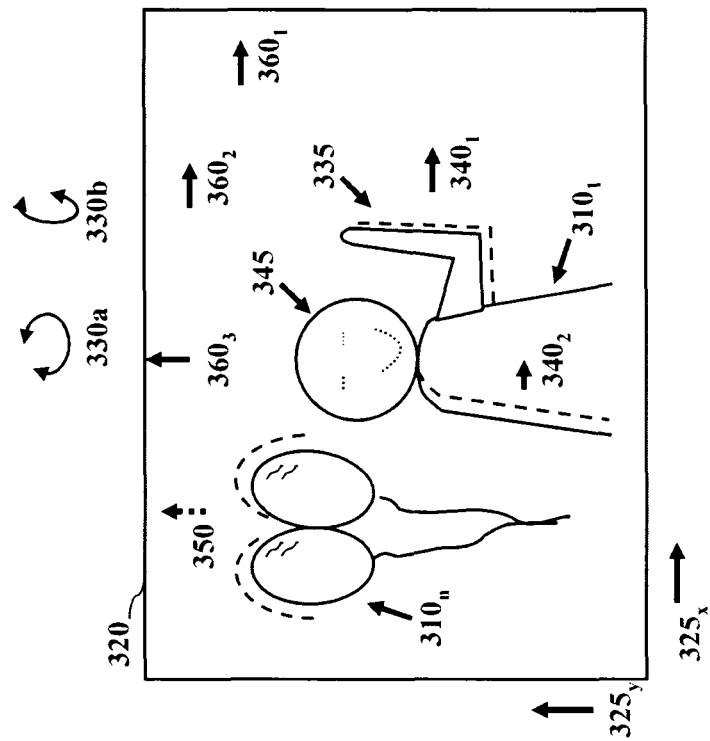
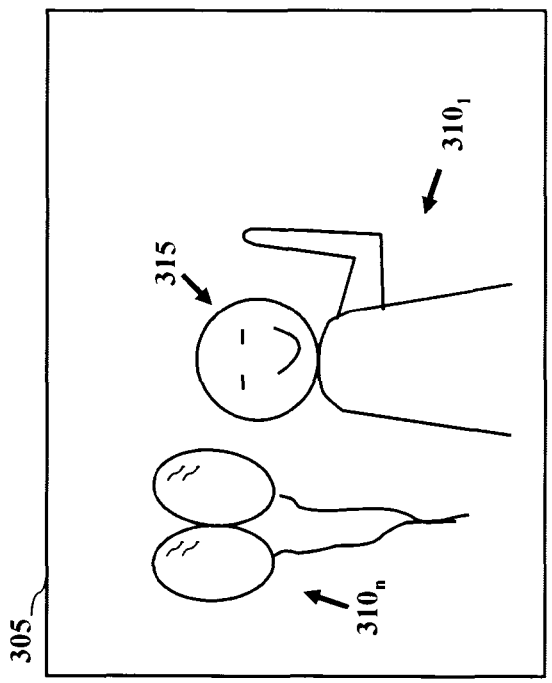
Fig. 3B
Fig. 3A

METHOD AND APPARATUS FOR IMAGE STABILIZATION

CROSS-REFERENCE TO RELATED APPLICATION

This application claims the benefit of U.S. Provisional Application No. 61/251,379, filed on Oct. 14, 2009, which is hereby fully incorporated by reference.

FIELD OF THE INVENTION

The present invention relates in general to digital image stabilization of video data and more particularly to digital stabilization of image data detected by a CMOS sensor during capture.

BACKGROUND OF THE INVENTION

User operation of video imaging devices, and in particular hand-held recording devices, can produce blurred or displaced image data due to small movements of the operator while supporting the imaging device. Blurred or distorted image data, however, is not preferred. Accordingly, conventional methods and devices have been employed for stabilization of image data captured by video imaging devices. For example, one conventional method includes employing one or more motion sensors to detect motion of the imaging device for correction of image data. These methods require motion sensors and can still result in digital distortions as the motion sensing arrangements typically employed usually do not detect rotational motion. Difficulties with image stabilization may additionally increase using zoom features of the imaging device.

The conventional methods and devices, however, do not account for real-time, or near real-time, digital video stabilization for image data captured by CMOS sensors, in particular rolling shutter sensors. Previous attempts have been directed at performing off-line post-processing to compensate for translational transformation. These methods, however, do not account for outliers introduced by local object motion or correct for rolling shutter imaging artifacts. Another approach involves off-line processing which usually differs from on-line processing by requiring higher power consumption, higher bandwidth, higher processing delay and higher algorithmic complexity.

Thus, there is a need in the art for systems and methods to address one or more drawbacks of devices employing CMOS sensors.

BRIEF SUMMARY OF THE INVENTION

Disclosed and claimed herein, are systems and methods for stabilization of image data. In one embodiment a method includes detecting image data for a first frame, detecting image data for a second frame, performing motion estimation to determine one or more motion vectors associated with global frame motion for image data of the first frame, performing an outlier rejection function to select at least one of the one or more motion vectors and determining a global transformation for image data of the first frame based, at least in part, on motion vectors selected by the outlier rejection function The method further includes determining a stabilization transformation for image data of the first frame by refining the global transformation to correct for unintentional motion and applying the stabilization transformation to image data of the first frame to stabilize the image data of the first frame.

Other aspects, features, and techniques of the invention will be apparent to one skilled in the relevant art in view of the following detailed description of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3A depicts a graphical representation of image data for a frame according to one embodiment of the invention;

FIG. 3B depicts a graphical representation of image data for the frame of FIG. 3A including image artifacts according to one embodiment of the invention;

DETAILED DESCRIPTION OF THE EXEMPLARY EMBODIMENTS

One aspect of the present invention relates to stabilization of image data, such as video data, by an imaging device. In one embodiment, a process is provided for stabilization of image data detected by a CMOS image sensor, such as a rolling shutter sensor or global shutter sensor. The image stabilization process may be based on motion of image data relative to previous or consecutive frames of image data to determine a stabilization transformation for correction of unintentional motion, such as user movements which are translated into instabilities in captured image data. Unintentional motion may relate to user motion of an imaging device that is undesired, such as hand shake. The process may include a warping transformation responsive to a plurality of motion vectors, and an outlier function to provide a multi-stage refinement process for selecting one or more motion vectors. According to another embodiment, the process may additionally include determining a global transformation of image data based on previous or consecutive frame data, and determination of a confidence measure associated with the global transformation to reduce false estimations in the global transformation. The process may further include determination of a stabilization transformation based on the global transformation to correct for one or more unintentional movements affecting detection of image data.

According to another embodiment, an imaging device is provided, the imaging device for stabilization of video image data in real-time or near real-time as described herein. In that fashion, image data may be detected and corrected without the need for post-processing of the video image data.

Description of the Exemplary Embodiments

Figure 1:
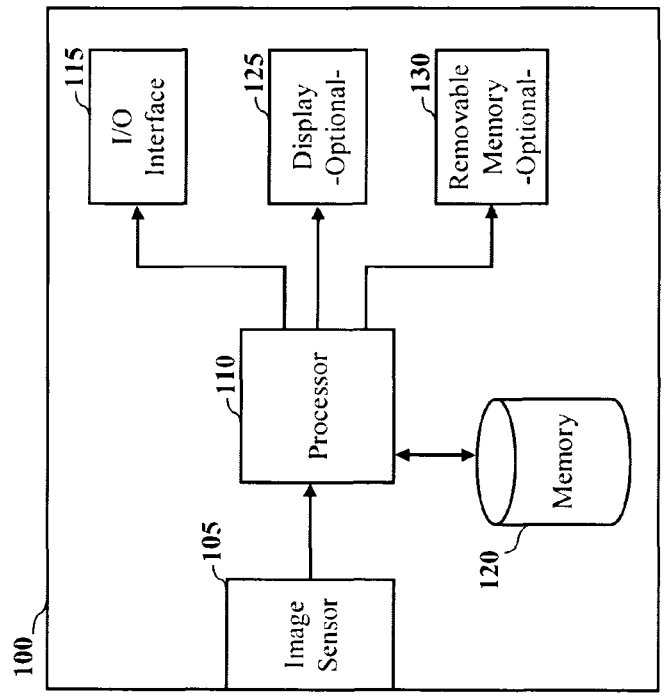
FIG. 1 depicts a simplified block diagram of a video imaging device according to one embodiment of the invention.

FIG. 1 depicts a simplified block diagram of an imaging device configured to provide stabilization of image data according to one embodiment of the invention. Device 100 related to an imaging device such as a video camera, or device in general including a video imaging device (e.g., personal communication unit). Image sensor 105 of device 100 may be configured to capture image data for one or more frames. According to one embodiment, image sensor 105 relates to a complementary metal-oxide semiconductor (CMOS) sensor. According to a further embodiment, image sensor 105 may relate to one of a rolling shutter sensor and global shutter sensor. As used herein, a rolling shutter sensor relates to image acquisition device which is detecting by scanning pixel data of the image sensor vertically or horizontally across the frame. A global shutter sensor relates to wherein image data of the frame is captured simultaneously.

Device 100 includes processor 110 coupled to image sensor 105 and may be configured to process image data detected by image sensor 105 associated with one or more frames. Exemplary input to the system includes, but is not limited to standard definition (SD) and high definition (HD) video. Processor 110 may be configured to process image data for output via input/output interface 115 and/or storage on memory 120. In certain embodiments, device 100 may be configured to output image data to optional memory 125 for storage (e.g., removable media, DVD-r, etc.) and/or optional display 130.

As will be described in more detail below with respect to FIG. 2, device 100 may be configured to perform a process for image detection including one or more of motion estimation calculations, determining a global distortion and applying a complex transformation to image data. Processor 110 may be configured to provide real-time digital image stabilization based on image data detected by image sensor 105. According to another embodiment, processor 110 may be configured to minimize motion estimation calculations for stabilization of captured image data. Device 100 may further be configured to provide complex distortion correction which is more complex than affine. Processor 110 may be configured to operate based on one or more instructions stored in memory 120, wherein memory 120 relates to one of ROM and RAM memory. Executable instructions and/or data received by device 100 may be stored by memory 120. Although device 100 has been described above with reference to a rolling shutter configuration for image sensor 105, it should equally be appreciated that device 100 may relate to a global image sensor. Although elements in FIG. 1 may be described as hardware, it should be appreciated that the functions of the elements may be implemented in a variety of ways including hardware, firmware, software, and combinations thereof.

Figure 2:
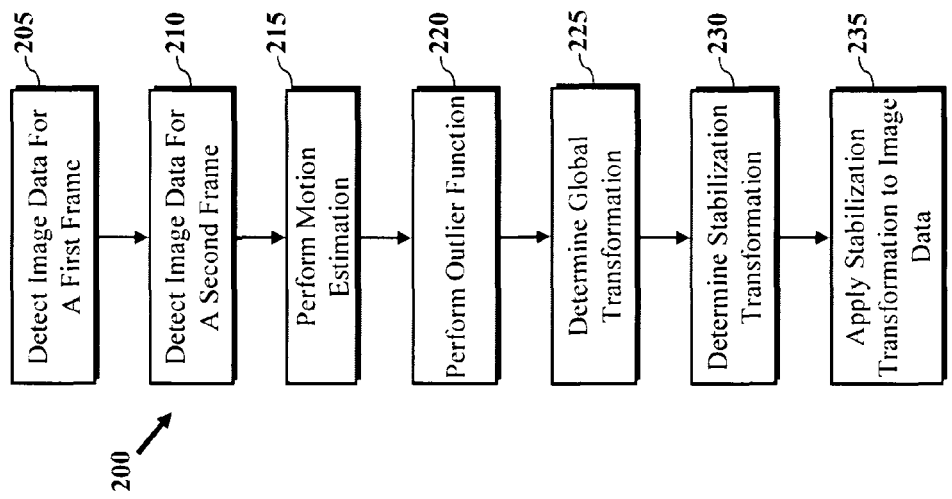
FIG. 2 depicts a process for stabilization of image data according to one embodiment of the invention.

Referring now to FIG. 2, a process is depicted for stabilization of image data detected by the device of FIG. 1 according to one embodiment of the invention. Process 200 may be initiated by detecting image data for a first frame at block 205 and detecting image data for a second frame at block 210. According to one embodiment, image data detected at blocks 205 and 210 may be consecutive frames. Delay between capture of frames may be based on video standards for SD and HD video data, including but not limited to 30 frames/second. At block 215, motion estimation may be performed to determine one or more motion vectors associated with the first frame. As will be described in more detail below with respect to FIG. 3, motion vectors may be determined for global motion, such as motion of the entire image frame. Similarly, motion vectors may be calculated for local motion, motion of objects within the frame. Motion vectors may be determined based on a comparison of image data associated with the first and second frame. In certain embodiments, a plurality of frames may be employed for motion estimation, such as previously detected and/or subsequently detected frames to perform motion estimation. In one embodiment, motion estimation may be hierarchical, wherein one or more motion vectors may be determined for coarse and fine resolutions of image data. However, performing full motion estimation for all blocks in a frame may be very demanding. Accordingly, an outlier function may be performed at block 220. The outlier function, as will be described in more detail below with respect to FIG. 4, may be performed to select one or more motion vectors. The outlier function may determine which motion vectors are not related to global motion within the image frame and thus, select motion vectors associated with global motion. In that fashion outliers, which may lead to suboptimal stabilization, may be removed.

Based on the outlier function performed at block 220, process 200 may continue by determining a global transformation at block 225 based on the image data for the first and second frame. The global transformation provides a measurement of global frame motion which may be used for transformation of the image data to align frames. The global transformation may further be associated with a confidence measure. In one embodiment, the processor may determine a confidence measure for the global transformation. The confidence measure of the global transformation may be based on several metrics and may depend on the coverage of the frame by valid motion vectors. Higher coverage should result in higher confidence. The parameters of detected global transformation are examined and high deviations of parameters from normal values (e.g., zoom should be close to unity) will also result in lower confidence. Also, for the same coverage, higher detected rolling shutter artifacts will result in a lower confidence value.

The confidence measure may be employed to reduce false estimations of global transformation in the presence of three-dimensional (3D) and/or complex motion in one or more frames (e.g., a scene). The confidence measure may similarly reduce false estimations when scene information includes limited details. By way of example, when one or more image frames directed to a white wall may result in a reduced confidence level as detail in one or more frames may be difficult to distinguish. The confidence measure of a global transformation can depend on complexity of the global transformation between one or more images. According to another embodiment, the confidence measure may be related to rolling shutter and/or other undesired effects found in a global transformation and coverage of a frame by motion vectors. For example, for complex global transformations a higher number of motion vectors should be determined to obtain the same confidence measures between a series of frames. By decreasing the coverage of motion vectors the confidence measure may decrease. In that fashion, confidence measure may be employed to moderate the global transformation by blending the global transformation with an identity transformation, wherein for a zero confidence level the global transformation would be the identity transformation.

Based on the global transformation determined at block 225, the device may then determine a stabilization transformation at block 230. A stabilization transformation may be employed to correct for unintentional motion on an image frame, such as unintentional movements by the user. The stabilization transformation may further correct for one or more rolling shutter artifacts, such as skew, wobble, partial exposure, and distortion. In one embodiment, intentional motion is extracted from a global transformation between consecutive frames by temporally smoothing a global transformation. In one embodiment, the global transformation may be smoothed by recursive filtering, such as using Kalman filtering. Rolling shutter artifacts may be considered an undesired part of the global transformation and thus, filtering of the global transformation should not include smoothing of the rolling shutter artifacts. As such, the stabilization transformation may be determined for the remaining unintentional motion. In one embodiment, correction the stabilization transformation may be characterized as:

$$x_{new} = c_1 x_{old} + c_2 y_{old} + c_3 xy + c_4 y_{old}^2 + c_5$$

$$y_{new} = c_6 x_{old} + c_7 y_{old} + c_8 xy + c_9 y_{old}^2 + c_{10}$$

wherein $x_{old}$ and $y_{old}$ are pixel coordinates for a corrected image and $x_{new}$ and $y_{new}$ are pixel coordinates of the captured frame.

According to another embodiment, the stabilization may be characterized as:

$$x_{new} = c_1 x_{old} + c_2 y_{old} + c_3 xy + c_4 y_{old}^2 + c_5 x_{old}^2 + c_6$$

$$y_{new} = c_7 x_{old} + c_8 y_{old} + c_9 xy + c_{10} y_{old}^2 + c_{11} x_{old}^2 + c_{12}$$

At block 235, the stabilization transformation is applied to image data of the first frame. Determination and application of the stabilization transformation may be determined in real-time, or near real-time. In one embodiment, the stabilization transformation is performed by a warping unit of the processor to transform pixel data based on the stabilization transformation. For example, a warping process may substitute one or more individually shifted pixels based on the transformation.

Although process 200 is described above relating to digital video stabilization only, it should also be appreciated that process 200 may correct for lens distortion effects of an imaging sensor (e.g., image sensor 105). For example, process 200 may include applying an inverse lens distortion function to motion vectors determined at block 215 during motion estimation. Additionally, application of a stabilization transformation at block 235 may perform correction for unintentional motion and lens distortion correction.

FIGS. 3A-B depict graphical representations of image data associated with a frame. Referring first to FIG. 3A, image frame 305 is a simplified depiction of image data which is not affected by unintentional motion or rolling shutter artifacts of an image sensor. According to one embodiment of the invention, real-time, or near real-time, stabilization of image data may be provided to account for global motion of image data. Image frame 305 may include one or more objects, $310_{1-n}$, shown as person $310_1$ and balloons $310_n$. As shown in FIG. 3A, image data associated with object $310_1$ includes detail shown as 315.

Referring now to FIG. 3B, image data for a frame is depicted which includes one or more inconsistencies (e.g., blurring, artifacts, etc.) due to unintentional motion of the imaging device during capture. Image frame 320 relates to image frame 305 including objects $310_{1-n}$. In one embodiment, image data of frame 320 relates to image data detected by a rolling shutter sensor of an imaging device (e.g., device 100). Unintentional motion affecting the imaging device in capturing image data may adjust pixel data as shown by directions $325_x$, $325_y$, 330a and 330b, which may include global motion of image data. Based on image data for frame 320 and image data of a second frame (not shown in FIG. 3B), one or more motion vectors may be determined. By way of example, motion vectors $340_{1-2}$ relate to motion of image data for object $310_1$. Additionally, due to unintentional motion detail (e.g., detail 315) of object $310_1$ may be blurred or distorted as shown by 345. Motion vector 350 relates to motion of object $310_n$. Motion vectors may additionally be determined for image data of the image frame shown as $360_{1-n}$ and may be associated with one or more regions of the frame. To provide real-time image stabilization, one or more motion vectors of the image frame may be selected to determine a stabilization transformation. Selection of the motion vectors may be determined by an outlier function. According to another embodiment, one or more motion vectors may be selected such that the number of motion estimations is minimized.

Figure 4:
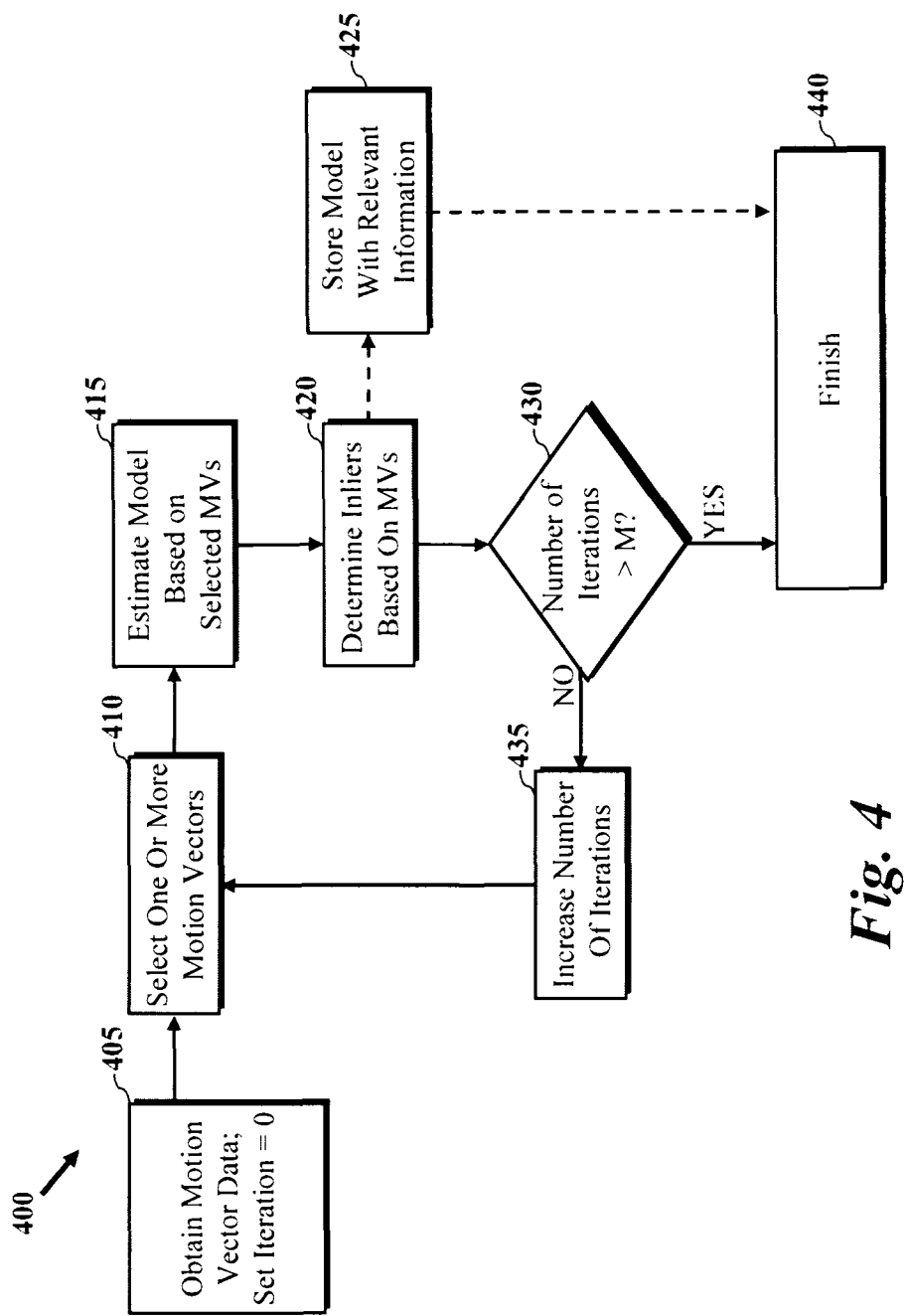
FIG. 4 depicts an outlier function according to one embodiment of the invention.

Referring now to FIG. 4, a process is depicted for selecting one or more motion vectors by an outlier function according to one or more embodiments of the invention. Process 400 allows for selection of one or more motion vectors to minimize motion estimation calculations. Additionally, stabilization of image data may account for local moving objects and the ability to track regions of the frame undergoing non-global motion.

Process 400 may be initiated by obtaining motion vectors at block 405. The outlier function may be configured to determine motion vectors which are not part of global motion based on one or more motion vector weights. Motion vector weights may reflect the relevancy of each region of a frame to be considered as an inlier (e.g., global motion indicator). Motion vectors weights may be employed when selecting regions of blocks of image data for determining a global transformation and thus may form a basis for weights employed by the outlier function of process 400. Accordingly, motion vector data obtained at block 405 may include motion vectors weights associated with each motion vector. Motion vector analysis may be performed on a derived, near optimal, sparse set of selected image locations. The use of a sparse set of image locations for motion vector analysis reduces motion vector analysis time and processing requirements. The rating of regions of a video frame as to likelihood of containing areas exhibiting global motion or objects exhibiting local motion may be employed for selection of one or more regions and for subsequent use in selecting regions appearing in future frames. As will be described below, process 400 may perform one or more iterations and thus may further include establishing the number of iterations to zero at block 405.

At block 410, one or more motion vector vectors may be selected from the obtained motion vector data. In one embodiment, the motion vectors may be selected randomly at block 410. The number of motion vectors selected may be based on a model employed for the outlier function. Based on the selected motion vectors, a model may be estimated at block 415.

To correct for translational motion only, for example for a global shutter sensor of the image sensor, the following model may be employed:

$$x_{new} = x_{old} + d_x$$

$$y_{new} = y_{old} + d_y$$

To correct for translational and rotational motion with possible zoom, for example for a global shutter sensor, the following model may be employed:

$$x_{new} = z x_{old} + r y_{old} + d_x$$

$$y_{new} = -r x_{old} + z y_{old} + d_y$$

To correct for rolling shutter transformation assuming simple camera motion, the following model may be employed:

$$x_{new} = z_x x_{old} + (v_x + r)x_{old} + v_r y_{old}^2 + d_x$$

$$y_{new} = -r x_{old} + (1 + v_y) y_{old} - v_r x_{old} y_{old} + d_y$$

To correct for rolling shutter transformation assuming complex camera motion, the following model may be employed:

$$x_{new} = c_1 x_{old} + c_2 y_{old} + c_3 xy + c_4 + y_{old}^2 + c_5 x_{old}^2 + c_6$$

$$y_{new} = c_7 x_{old} + c_8 y_{old} + c_9 xy + c_{10} y_{old}^2 + c_{11} x_{old}^2 + c_{12}$$

Accordingly, model parameters may be calculated at block 415 based on the selected motion vectors and process 420 may continue by determining, at block 420, which motion vectors from the set of all motion vectors obtained in 400 are inliers, according to model parameters calculated at block 415. A motion vector will be marked as an inlier if it agrees with a selected model determined at block 415 up to a predefined threshold. Based on the determined inliers at block 420, a model with the highest mark (for example, with the largest number of inlier motion vectors or with highest total weight of inlier motion vectors) may be stored at block 425 including relevant information to determine the inlier motion vectors.

Based on selected motion vector data, process 400 may check if an additional iteration is to be performed at block 430. According to one embodiment, a number of iterations may be required. When additional iterations are to be performed (e.g., "NO" path out of decision block 430) the number of iterations may be increased at block 435 and one or more motion vectors may be selected at block 410. An estimated model for selected motion vectors may be updated at block 415. When the number of iterations has been met (e.g., "YES" path out of decision block 430), the outlier function may finish at block 440. A result of the outlier function may be a reduction in the number of motion vectors and overall processing required to perform motion estimation for determining a global transformation.

As the final stage, after the categorization of motion vectors to those associated with global frame motion (i.e. inliers) and those associated with non-global motion (i.e. outliers), the outlier function may include inlier tracking, responsible for tracking regions with non-global motion between frames and providing a weight for every region of the frame. The weight for the region reflects the likelihood of containing areas exhibiting global motion (as opposed to areas or objects exhibiting local motion). These weights are then used, as described above, by outlier function operating on the temporally close frames.

Figure 5:
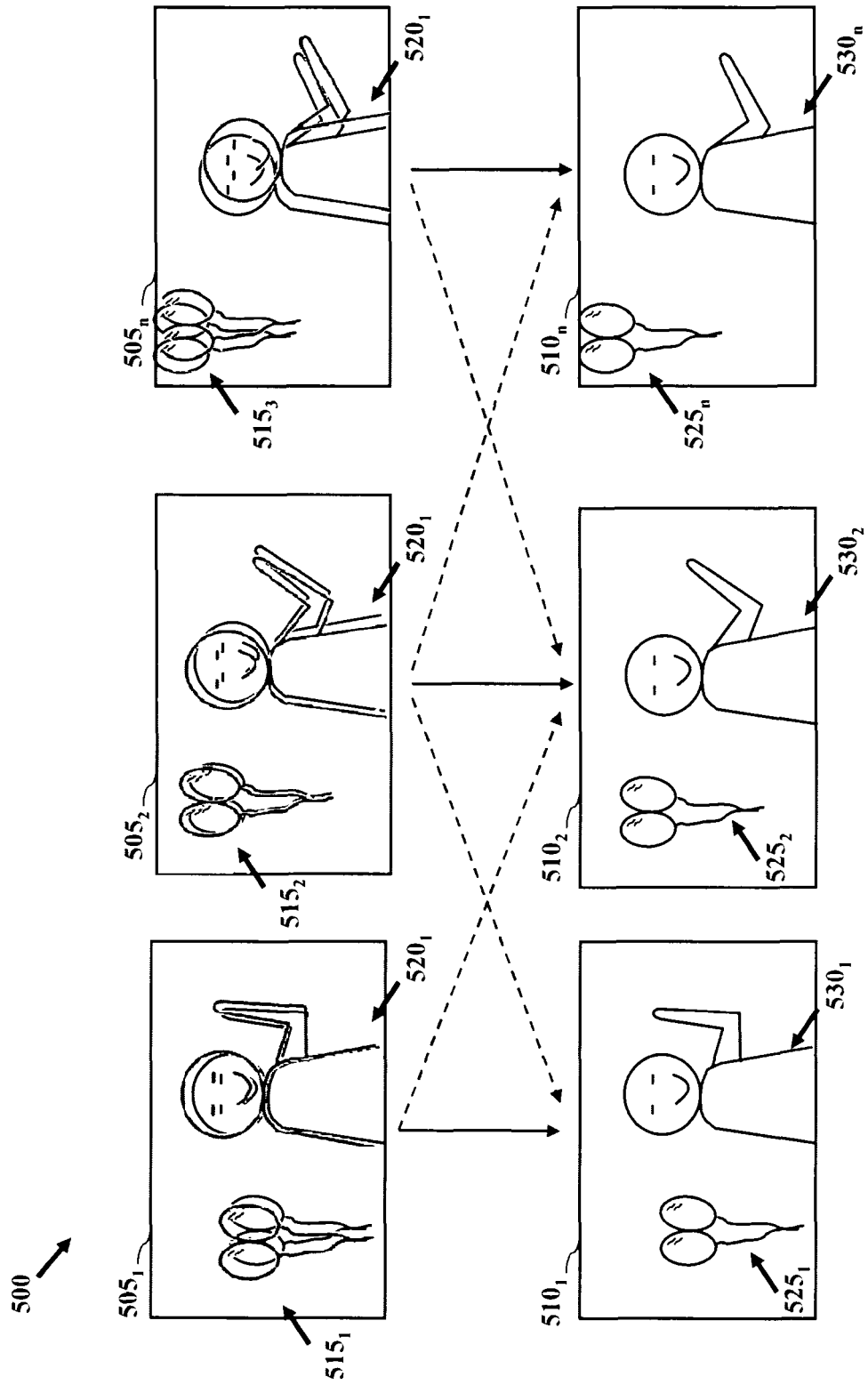
FIG. 5 depicts a graphical representations image data for a series of frames according to one embodiment of the invention.

Referring now to FIG. 5, a graphical representation is depicted of real-time digital image stabilization for a series of frames. Scene 500 relates to one or more frames $505_{1-n}$ detected by an image sensor of the device including one or more rolling shutter artifacts due to unintentional motion. Based on the detected image data, the devices and methods as described herein may be configured to provide image stabilization for scenes. Frames $510_{1-n}$ illustrate application of a stabilization transform, as described herein, to frames $505_{1-n}$. According to one embodiment, image data associated with frames $505_1$ and $505_2$ may be employed to determine a stabilization transformation resulting in image $510_1$. According to another embodiment, in addition to a current frame, such as frame $505_2$, previous and subsequent frames may be employed to apply image stabilization to frame data, such as frames $505_1$ and $505_2$. Alternatively, or in combination, correct image data, such as image frame $510_1$ may be employed for correction of a current frame, such as $505_2$.

According to another embodiment, scene 500 further depicts correction for global motion of image data due to unintentional motion and further allows for local motion of object data. For example, local motion of object $515_{1-n}$ and object $520_{1-n}$ may be kept during correction of image stabilization. Accordingly, frames $510_{1-n}$ include objects $525_{1-n}$ and $530_{1-n}$ wherein image data has been corrected for unintentional global motion while preserving local motion.

Figure 6:
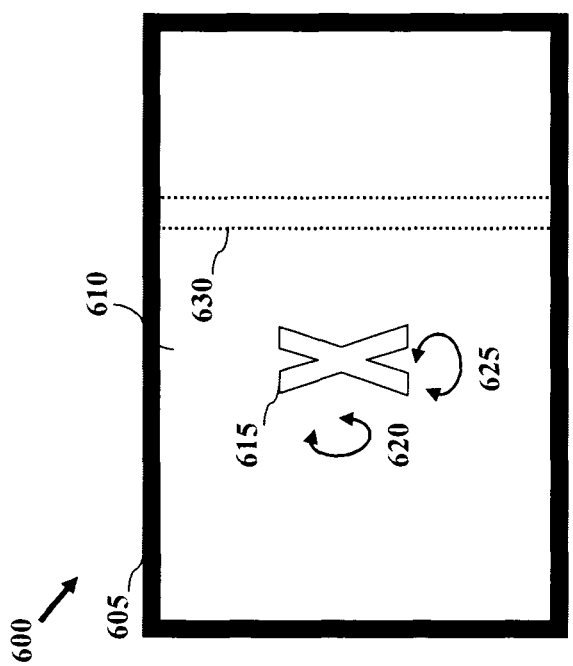
FIG. 6 depicts a graphical representations of image data for a frame according to another embodiment of the invention.

FIG. 6 depicts a graphical representation of an image frame according to one embodiment of the invention. According to one embodiment, the image sensor (e.g., image sensor 105) may provide additional data associated with pixel area beyond the video frame size such as a non-visible detection areas or optical black areas, shown as 605. According to one embodiment, pixel data of non-visible detection area 605 may be utilized in addition to image data of a frame, shown as 610, for determination of a global transformation. According to another embodiment, the devices and methods as described herein may further be configured to account for complex motion of an object. As depicted in FIG. 6, complex motion of object 615, as shown by direction arrows 620 and 625, may be accounted for during correction for unintentional motion. According to another embodiment, pixel data of the frame associated with regions, as shown by 630, may additionally be employed to detection of the complex motion. Region 630 relates to a vertical region of the detection area. Pixel data associated with region 630 in a first image may be compared with pixel data in region 630 of a second frame to aid in correction of unintentional motion. It should be appreciated that other regions or areas may similarly be employed.

Figure 7:
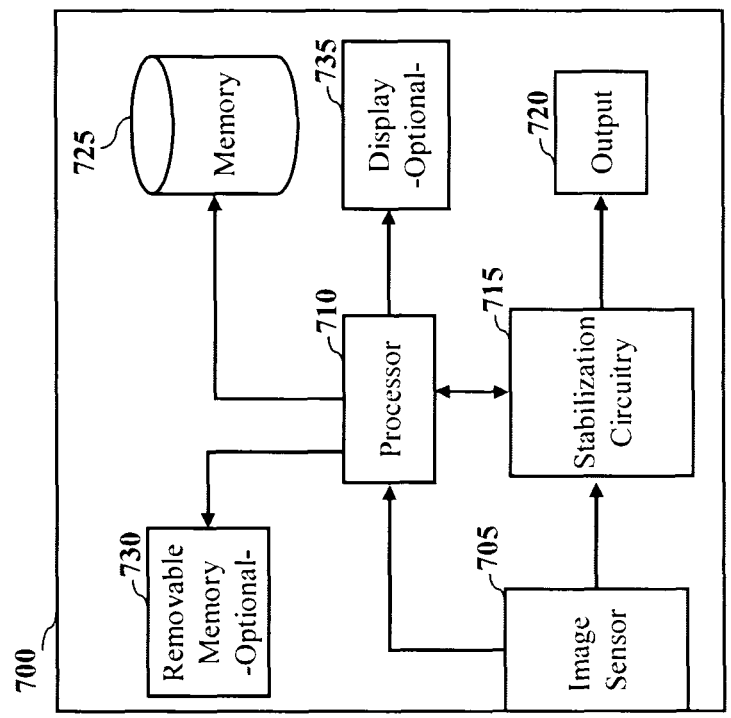
FIG. 7 depicts a simplified block diagram of a video imaging device according to another embodiment of the invention.

Referring now to FIG. 7, a simplified block diagram is depicted of a device configured to provide real-time stabilization of image data according to another embodiment of the invention. Device 700 relates to the device of FIG. 1 including stabilization circuitry configured to determine an image stabilization transformation for application to image data. Accordingly, elements in device 700 may operate similarly to those described above with respect to FIG. 1. Device 700 includes image sensor 705 and processor 710 coupled to image sensor 105. Processor 710 may be configured to apply image stabilization to image data based on a stabilization circuitry 715. Stabilization circuitry 715 may be configured to determine the stabilization transformation as described herein. Processor 710 may be configured to output stabilized image data to via output interface 720 and/or storage on memory 725. In certain embodiments, device 700 may be configured to output image data to optional memory 730 (e.g., removable media, DVD-r, etc.) and/or optional display 735.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Trademarks and copyrights referred to herein are the property of their respective owners.

What is claimed is:

1. A method for stabilization of image data by an imaging device, the method comprising the acts of:
   detecting image data for a first frame;
   detecting image data for a second frame;

performing motion estimation based on image data for the first and second frames to determine one or more motion vectors associated with global frame motion for image data of the first frame;

performing an outlier rejection function to select at least one of the one or more motion vectors, wherein the outlier rejection function employs a sparse set of selected and weighted image locations within the first frame to select the one or more motion vectors;

determining a global transformation for image data of the first frame based, at least in part, on motion vectors selected by the outlier rejection function and on a confidence measure that the global transformation will exclude non-global estimations;

determining a stabilization transformation for image data of the first frame by refining the global transformation to correct for unintentional motion, wherein the refining employs recursive filtering to smooth at least a portion of the global transformation that is separate from at least a rolling shutter artifact included with the global transformation; and applying the stabilization transformation to image data of the first frame to stabilize the image data of the first frame.

2. The method of claim 1, wherein the first frame relates to an image frame detected consecutively following detection of image data for the second frame.

3. The method of claim 1, wherein image data detected for the first and second frames relates to image data detected by one of a rolling shutter sensor and a global shutter sensor.

4. The method of claim 1, wherein motion estimation relates to hierarchical characterization of local and global motion for image data, wherein image data is refined for several scales of image data to select one or more motion vectors associated with global motion of the image data.

5. The method of claim 1, further comprising limiting the motion estimation to analysis of select regions of image data to reduce processing complexity and time.

6. The method of claim 1, wherein the outlier rejection function further includes performing outlier tracking of non-global motion between frames to generate weight values assigned to regions of the image data.

7. The method of claim 1, wherein the global transformation is associated with one or more models for classifying motion of image data, wherein weights are assigned to regions of the first image frame related to motion vectors determined for one or more regions of the frame.

8. The method of claim 1, wherein the image stabilization transformation is calculated to reduce false global transformation estimations for one of complex scene motion and insufficient detail of motion data of the first frame.

9. The method of claim 1, wherein applying the image stabilization transformation includes a warping transformation of pixel data to individually adjust one or more pixel locations within the first frame.

10. The method of claim 1, wherein the image stabilization transformation corrects for lens distortion by applying an inverse lens distortion function to motion vectors when determining the global transformation and applying forward lens distortion function during the image stabilization transformation.

11. The method of claim 1, wherein unintentional motion relates to user applied motion to the imaging device that is undesired.

12. A device configured for stabilization of image data, the device comprising:

an image sensor configured to detect image data for a first and second frame;

a memory; and a processor coupled to the memory and the image sensor wherein processor is configured to:

perform motion estimation to determine one or more motion vectors associated with global frame motion for image data of the first frame;

perform an outlier rejection function to select at least one of the one or more motion vectors, wherein the outlier rejection function employs a sparse set of selected and weighted image locations within the first frame to select the one or more motion vectors;

determine a global transformation for image data of the first frame based, at least in part, on motion vectors selected by the outlier rejection function and on a confidence measure that the global transformation will exclude non-global estimations;

determine a stabilization transformation for image data of the first frame by refining the global transformation to correct for unintentional motion, wherein the refining employs recursive filtering to smooth at least a portion of the global transformation that is separate from at least a rolling shutter artifact included with the global transformation; and apply the stabilization transformation to image data of the first frame to stabilize the image data of the first frame.

13. The device of claim 12, wherein the first frame relates to an image frame detected consecutively following detection of image data for the second frame.

14. The device of claim 12, wherein the image sensor relates to one of a rolling shutter sensor and a global shutter sensor.

15. The device of claim 12, wherein motion estimation relates to hierarchical characterization of local and global motion for image data, wherein image data is refined for several scales of image data to select one or more motion vectors associated with global motion of the image data.

16. The device of claim 12, wherein the processor is further configured to limit the motion estimation to analysis of select regions of image data to reduce processing complexity and time.

17. The device of claim 12, wherein the processor is further configured to perform outlier tracking of non-global motion between frames resulting in weight values assigned to regions of the image data for the outlier rejection function.

18. The device of claim 12, wherein the global transformation is associated with one or more models for classifying motion of image data, wherein weights are assigned to regions of the first image frame related to motion vectors determined for one or more regions of the frame.

19. The device of claim 12, wherein the image stabilization transformation is calculated to reduce false global transformation estimations for one of complex scene motion and insufficient detail of motion data of the first frame.

20. The device of claim 12, wherein the processor is further configured to apply the image stabilization transformation by a warping transformation of pixel data to individually adjust one or more pixel locations within the first frame.

21. The device of claim 12, wherein the image stabilization transformation corrects for lens distortion by applying an inverse lens distortion function to motion vectors when determining the global transformation and applying forward lens distortion function during the image stabilization transformation.

22. The device of claim 12, wherein unintentional motion relates to user applied motion to the imaging sensor that is undesired.

23. A method for stabilization of image data by an imaging device, the method comprising the acts of:
 detecting image data for a first frame;
 detecting image data for a second frame;
 performing motion estimation based on image data for the first and second frames to determine one or more motion vectors;
 performing an outlier rejection function to select at least one motion vector associated with global frame motion, wherein the outlier rejection function employs a sparse set of selected and weighted image locations within the first frame to select the at least one motion vector;
 determining a global transformation for image data of the first frame based, at least in part, on motion vectors selected by the outlier rejection function;
 determining a stabilization transformation for image data of the first frame by refining the global transformation to correct for unintentional motion, wherein the refining employs recursive filtering to smooth at least a portion of the global transformation that is separate from at least a rolling shutter artifact included with the global transformation; and
 applying the stabilization transformation to image data of the first frame to stabilize the image data of the first frame.

24. The method of claim 23, wherein the first frame relates to an image frame detected consecutively following detection of image data for the second frame.

25. The method of claim 23, wherein image data detected for the first and second frames relates to image data detected by one of a rolling shutter sensor and a global shutter sensor.

26. The method of claim 23, wherein motion estimation relates to hierarchical characterization of local and global motion for image data, wherein image data is refined for several scales of image data to effectively increase the motion estimation search area and where the complexity of motion estimation is decreased by selecting at each hierarchy one or more motion vectors associated with global motion of the image data.

27. The method of claim 23, further comprising limiting the motion estimation to analysis of select regions of image data to reduce processing complexity and time.

28. The method of claim 23, wherein the outlier rejection function further includes performing outlier tracking of non-global motion between frames to generate weight values assigned to regions of the image data.

29. The method of claim 23, wherein the global transformation is associated with one or more models for classifying motion of image data, and wherein the global transformation depends on the model and on weights associated with each motion vector.

30. The method of claim 23, wherein the image stabilization transformation is adjusted to reduce false global transformation estimations for one of complex scene motion and insufficient detail of motion data of the first frame.

31. The method of claim 23, wherein applying the image stabilization transformation includes a warping transformation of pixel data to individually adjust one or more pixel locations within the first frame.

32. The method of claim 23, wherein the image stabilization transformation corrects for lens distortion by applying an inverse lens distortion function to motion vectors when determining the global transformation and applying forward lens distortion function during the image stabilization transformation.

33. The method of claim 23, wherein unintentional motion relates to undesired user applied motion to the imaging device.

34. A device configured for stabilization of image data, the device comprising:
 an image sensor configured to detect image data for a first and second frame;
 a memory; and
 a processor coupled to the memory and the image sensor wherein processor is configured to:
  perform motion estimation to determine one or more motion vectors;
  perform an outlier rejection function to select at least one motion vector associated with global frame motion, wherein the outlier rejection function employs a sparse set of selected and weighted image locations within the first frame to select the at least one motion vector;
  determine a global transformation for image data of the first frame based, at least in part, on motion vectors selected by the outlier rejection function;
  determine a stabilization transformation for image data of the first frame by refining the global transformation to correct for unintentional motion, wherein the refining employs recursive filtering to smooth at least a portion of the global transformation that is separate from at least a rolling shutter artifact included with the global transformation; and
  apply the stabilization transformation to image data of the first frame to stabilize the image data of the first frame.

35. The device of claim 34, wherein the first frame relates to an image frame detected consecutively following detection of image data for the second frame.

36. The device of claim 34, wherein the image sensor relates to one of a rolling shutter sensor and a global shutter sensor.

37. The device of claim 34, wherein motion estimation relates to hierarchical characterization of local and global motion for image data, wherein image data is refined for several scales of image data to effectively increase the motion estimation search area and where the complexity of motion estimation is decreased by selecting at each hierarchy one or more motion vectors associated with global motion of the image data.

38. The device of claim 34, wherein the processor is further configured to limit the motion estimation to analysis of select regions of image data to reduce processing complexity and time.

39. The device of claim 34, wherein the processor is further configured to perform outlier tracking of non-global motion between frames resulting in weight values assigned to regions of the image data for the outlier rejection function.

40. The device of claim 34, wherein the global transformation is associated with one or more models for classifying motion of image data, and wherein the global transformation depends on the model and on weights associated with each motion vector.

41. The device of claim 34, wherein the image stabilization transformation is adjusted to reduce false global transformation estimations for one of complex scene motion and insufficient detail of motion data of the first frame.

42. The device of claim 34, wherein the processor is further configured to apply the image stabilization transformation by a warping transformation of pixel data to individually adjust one or more pixel locations within the first frame.

43. The device of claim 34, wherein the image stabilization transformation corrects for lens distortion by applying an inverse lens distortion function to motion vectors when determining the global transformation and applying forward lens distortion function during the image stabilization transformation.

44. The device of claim 34, wherein unintentional motion relates to undesired user applied motion to the imaging sensor.

45. The method of claim 1, wherein the confidence measure depends on the coverage of the first frame by valid motion vectors.

46. The method of claim 1, wherein the confidence measure depends on the complexity of the global transformation.

47. The method of claim 1, wherein the confidence measure depends on undesirable effects found in the global transformation.

48. The method of claim 47, wherein the undesirable effects include rolling shutter effects including at least one of skew, wobble, partial exposure, and distortion.

49. The method of claim 1, wherein the confidence measure moderates the global transformation by blending an initial global transformation with an identity transformation.

50. The method of claim 7, wherein the models classify motion of image data as at least one of translational motion, translational and rotational motion, translational and rotational motion with zoom, rolling shutter transformation with simple camera motion, and rolling shutter transformation with complex camera motion.

51. The device of claim 12, wherein the confidence measure depends on the coverage of the first frame by valid motion vectors.

52. The device of claim 12, wherein the confidence measure depends on the complexity of the global transformation.

53. The device of claim 12, wherein the confidence measure depends on undesirable effects found in the global transformation.

54. The device of claim 53, wherein the undesirable effects include rolling shutter effects including at least one of skew, wobble, partial exposure, and distortion.

55. The device of claim 12, wherein the confidence measure moderates the global transformation by blending an initial global transformation with an identity transformation.

56. The device of claim 18, wherein the models classify motion of image data as at least one of translational motion, translational and rotational motion, translational and rotational motion with zoom, rolling shutter transformation with simple camera motion, and rolling shutter transformation with complex camera motion.

* * * * *

UNITED STATES PATENT AND TRADEMARK OFFICE
CERTIFICATE OF CORRECTION

Page 1 of 1

PATENT NO. : 8,508,605 B2
APPLICATION NO. : 12/755958
DATED : August 13, 2013
INVENTOR(S) : Dolgin et al.

It is certified that error appears in the above-identified patent and that said Letters Patent is hereby corrected as shown below:

ON THE TITLE PAGE

Item (56), under "OTHER PUBLICATIONS", in Column 2, Line 2, delete "PCT/US20101030286" and insert -- PCT/US2010/030286 --, therefor.

IN THE DRAWINGS

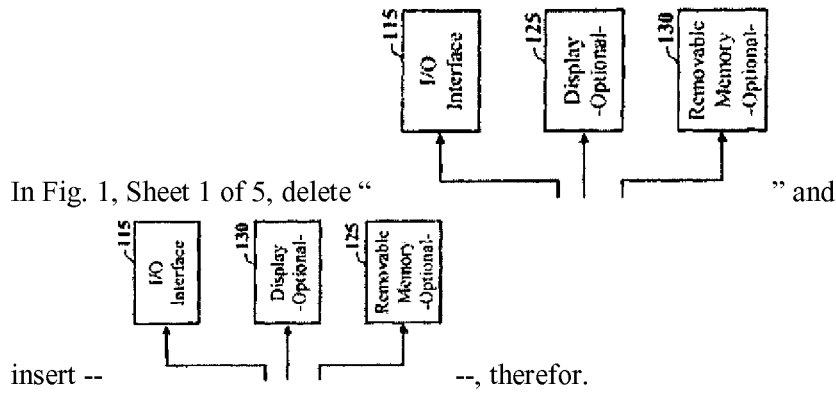

In Fig. 1, Sheet 1 of 5, delete " " and insert -- --, therefor.

IN THE SPECIFICATION

In Column 7, Line 12, delete "$x_{new}=c_1 x_{old}+c_2 y_{old}+c_3 xy+c_4 +y_{old}^2+c_5 x_{old}^2+c_6$" and insert -- $x_{new}=c_1 x_{old}+c_2 y_{old}+c_3 xy+c_4 y_{old}^2+c_5 x_{old}^2+c_6$ --, therefor.

Signed and Sealed this
Twentieth Day of May, 2014

Michelle K. Lee
*Deputy Director of the United States Patent and Trademark Office*